United States Patent
Koenen et al.

(10) Patent No.: US 10,202,957 B2
(45) Date of Patent: *Feb. 12, 2019

(54) PUSH BUTTON STARTING SYSTEM MODULE FOR OUTDOOR POWER EQUIPMENT

(71) Applicant: Briggs & Stratton Corporation, Wauwatosa, WI (US)

(72) Inventors: Robert John Koenen, Pewaukee, WI (US); Jason Hansen, Elkhorn, WI (US); Andrew Paskov, Brookfield, WI (US); Daniel Brueck, Brookfield, WI (US); Steven J. Weber, Germantown, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,429

(22) Filed: Mar. 14, 2017

(65) Prior Publication Data

US 2017/0226979 A1 Aug. 10, 2017

Related U.S. Application Data

(63) Continuation of application No. 14/454,139, filed on Aug. 7, 2014, now Pat. No. 9,624,890, which is a
(Continued)

(51) Int. Cl.
*F02N 11/08* (2006.01)
*F02N 11/10* (2006.01)
(Continued)

(52) U.S. Cl.
CPC ........ *F02N 11/0803* (2013.01); *A01D 34/001* (2013.01); *B60K 28/04* (2013.01);
(Continued)

(58) Field of Classification Search
CPC ............. F02N 11/0803; F02N 11/0848; F02N 11/0807; F02N 11/10; B60R 25/24;
(Continued)

(56) References Cited

U.S. PATENT DOCUMENTS 3,985,196 A 10/1976 Deschamps
4,051,915 A 10/1977 Behrens
(Continued)

FOREIGN PATENT DOCUMENTS

DE 19630747 9/1997
DE 19641898 11/1997
(Continued)

OTHER PUBLICATIONS

Notice of Acceptance for Australian Patent Application No. 2010241415 dated Dec. 15, 2015.
(Continued)

*Primary Examiner* — Sizo Vilakazi
(74) *Attorney, Agent, or Firm* — Andrus Intellectual Property Law, LLP (57) ABSTRACT

A self-contained starting module for outdoor power equipment that has control circuit and a start button. The starting module includes internal control circuit that can be either microprocessor based or analog. The control circuit receives a start signal from a start button of the starting module. The control circuit monitors for the presence of an enable device and, upon activation of the start button and the presence of the enable device, provides electric power to the electric load of the power equipment. When the start button is depressed for longer than a minimum engagement period, the control circuit initiates operation of the engine. If the start button is pressed for less than the minimum engagement period, the control circuit activates the electric load for an auxiliary period without starting the engine. During
(Continued)

engine operation, if the start button is depressed, the operation of the engine is terminated.

19 Claims, 11 Drawing Sheets

Related U.S. Application Data continuation-in-part of application No. 14/307,943, filed on Jun. 18, 2014, which is a continuation of application No. 13/953,860, filed on Jul. 30, 2013, now Pat. No. 8,763,579, which is a continuation of application No. 13/450,528, filed on Apr. 19, 2012, now Pat. No. 8,516,985, said application No. 14/454,139 is a continuation of application No. 12/622,101, filed on Nov. 19, 2009, now Pat. No. 8,171,907.

(60) Provisional application No. 61/862,991, filed on Aug. 7, 2013.

(51) Int. Cl.
 *B60K 28/04* (2006.01)
 *A01D 34/00* (2006.01)

(52) U.S. Cl.
 CPC .......... *F02N 11/0811* (2013.01); *F02N 11/10* (2013.01); *B60Y 2200/223* (2013.01)

(58) Field of Classification Search
 CPC ....... B60R 25/04; B60R 25/209; B60K 28/04; A01D 34/001
 See application file for complete search history.

(56) References Cited

U.S. PATENT DOCUMENTS

| | | | |
|---|---|---|---|
| 4,279,179 A | 7/1981 | Marto | |
| D345,166 S | 3/1994 | Kamlukin et al. | |
| 5,491,470 A | 2/1996 | Veligdan | |
| 5,713,320 A | 2/1998 | Pfaff et al. | |
| 5,818,330 A * | 10/1998 | Schweiger | B60R 25/02 123/179.2 |
| 5,934,051 A | 8/1999 | Hahn | |
| 6,351,703 B1 | 2/2002 | Avery, Jr. | |
| 6,354,388 B1 | 3/2002 | Teal et al. | |
| 6,445,084 B1 * | 9/2002 | Daiss | B60R 25/04 307/10.2 |
| 6,454,032 B1 | 9/2002 | Teal et al. | |
| 6,470,660 B1 | 10/2002 | Buss et al. | |
| 6,591,803 B2 | 7/2003 | Chang | |
| 6,609,357 B1 | 8/2003 | Davis et al. | |
| 7,071,436 B2 | 7/2006 | Coates | |
| 7,081,629 B2 | 8/2006 | Turner et al. | |
| 7,091,629 B2 | 8/2006 | Hawkins | |
| 7,150,253 B2 | 12/2006 | Itou et al. | |
| 7,168,407 B2 | 1/2007 | Ono et al. | |
| 7,216,616 B2 | 5/2007 | Asada et al. | |
| 7,352,072 B2 | 4/2008 | Dolker et al. | |
| 7,552,705 B2 | 6/2009 | Sekh et al. | |
| 7,628,138 B2 | 12/2009 | Ando | |
| 7,679,491 B2 | 3/2010 | Costello et al. | |
| 7,774,129 B2 | 8/2010 | Washio | |
| 7,886,706 B2 | 2/2011 | Grybush | |
| 8,063,505 B2 | 11/2011 | Pfohl et al. | |
| 8,171,907 B2 | 5/2012 | Koenen et al. | |
| 8,516,985 B2 | 8/2013 | Koenen et al. | |
| 8,763,579 B2 | 7/2014 | Koenen et al. | |
| 2005/0024195 A1 | 2/2005 | Bai | |
| 2009/0064957 A1 | 3/2009 | Grybush | |
| 2009/0095603 A1 * | 4/2009 | Pfohl | B60R 25/04 200/43.13 |
| 2010/0114464 A1 * | 5/2010 | Miller | B60K 28/04 701/113 |
| 2010/0132647 A1 | 6/2010 | Dietrich | |
| 2011/0118961 A1 * | 5/2011 | Koenen | B60K 28/04 701/113 |
| 2011/0264315 A1 | 10/2011 | Blind et al. | |

FOREIGN PATENT DOCUMENTS

| | | |
|---|---|---|
| EP | 3982202 | 3/2000 |
| FR | 2789950 | 8/2000 |
| GB | 1404357 | 8/1975 |
| WO | 2004/005086 | 1/2004 |

OTHER PUBLICATIONS

Extended European Search Report for EP Application No. 10191102.2 dated Mar. 1, 2011.

* cited by examiner

PUSH BUTTON STARTING SYSTEM MODULE FOR OUTDOOR POWER EQUIPMENT

CROSS-REFERENCE TO RELATED APPLICATION

The present application is a continuation of U.S. patent application Ser. No. 14/454,139, filed Aug. 7, 2014, which claims priority to U.S. Provisional Application No. 61/862,991, filed Aug. 7, 2013 and is a continuation-in-part of U.S. patent application Ser. No. 14/307,934, filed on Jun. 18, 2014, now U.S. Pat. No. 9,488,149, which is a continuation of U.S. patent application Ser. No. 13/953,860 filed Jul. 30, 2013, now U.S. Pat. No. 8,763,579, which is a continuation of U.S. patent application Ser. No. 13/450,528, filed Apr. 19, 2012, now U.S. Pat. No. 8,516,985, which is a continuation of U.S. patent application Ser. No. 12/622,101, filed on Nov. 19, 2009, now U.S. Pat. No. 8,171,907, the disclosures of which are incorporated herein by reference.

BACKGROUND OF THE INVENTION

The present disclosure generally relates to a starting system for an internal combustion engine. More specifically, the present disclosure relates to a push button starting system for the internal combustion engine of a piece of outdoor power equipment, such as a lawn tractor, walk behind mower, pressure washer, portable electric generator, snow blower or the like. The push button starting system requires both the presence of an enable device, such as a key fob, and depression of a start button to begin operation of the internal combustion engine.

Currently available outdoor power equipment, such as lawn tractors, walk behind mowers and the like, include an internal combustion engine that provides both the motive force for the power equipment and the required power to rotate a cutting blade. Typically, the internal combustion engine of the power equipment, such as a lawn tractor, is started by inserting a key into an ignition switch. Once the key is inserted into the ignition switch, the key is turned to crank the internal combustion engine. Typically, the key remains in the cranking position until the engine turns over and begins running Once the engine has started, the operator releases the key from the cranking position and the engine continues operation.

Although an ignition switch and key have been a successful way to start the internal combustion engine of a lawn tractor for many years, drawbacks exist for inexperienced users who may not feel comfortable with the procedures required to start the internal combustion engine. As an example, many inexperienced users are unclear as to how long the engine needs to crank when the engine is initially slow to start.

In addition to the drawbacks set forth above, lawn tractors that include an ignition switch and key may allow the operator to turn the key partially toward the cranking position. In this intermediate, auxiliary position, electric power from the vehicle battery is supplied to the electronics load of the lawn tractor, such as the headlights and other electrical components contained on the lawn tractor. The use of the auxiliary position is particularly beneficial when the operator does not want to start the engine but simply wants to operate the electrical components contained on the tractor. Although the auxiliary position is beneficial, if the ignition key is left in the auxiliary position for an extended period of time, the electric load will eventually drain the battery of the lawn tractor, thus rendering the lawn tractor inoperable without either replacing or recharging the battery.

SUMMARY OF THE DISCLOSURE

The present disclosure provides a push button starting system for outdoor power equipment, such as but not limited to a starting system for an internal combustion engine of a lawn tractor. The push button starting system requires both the presence of an enable device and depression of a start button to begin operation of the outdoor power equipment. The push button starting system of the present disclosure includes a self-contained starting module having internal circuitry that controls operation of many components of the lawn tractor, including the starting of the internal combustion engine of the lawn tractor. The internal circuitry in the starting module initiates operation of the internal combustion engine of the lawn tractor by closing the contacts of a starter solenoid relay to crank the engine.

A start button is integrated into the starting module and generates a start signal sensed by the internal circuitry of the starting module when the start button is in the activated position and an enable device is present. In one embodiment of the disclosure, the start button is a push button that is activated by depressing and holding the push button. The control circuit receives the start signal during the entire time the start button is in the activated state and the enable device remains present and detected.

When the control circuit of the starting module receives the start signal, the starting module awakens from a sleep mode and checks to determine the presence of an enable device. If the enable device is not present, the control circuit returns to the sleeping mode.

If the control circuit determines that the enable device is present and the start signal is being generated, the control circuit energizes a load relay which provides electric power to the electric load of the lawn tractor. After the load relay is energized, an auxiliary period timer starts. The starting module provides electric power to the electric load of the lawn tractor for only an auxiliary period. In one embodiment of the disclosure, the auxiliary period is two minutes. In this manner, the operator can power the electric load of the lawn tractor by depressing and releasing the start button.

The control circuit in the starting module then determines if the start signal was received for greater than a minimum engagement period. If the start signal was received for less than the minimum engagement period, the starting module continues the auxiliary period timer and monitors for an additional depression of the start button. If the start button is not depressed again, the control circuit eventually de-energizes the load relay after the expiration of the auxiliary period. The auxiliary period timer could alternatively be reset upon a brief depression of the start button for less than the minimum engagement period to extend the on time for the electric loads of the lawn tractor, which would allow the operator to keep the headlights on without the engine running If the start signal is present for greater than the minimum engagement period and the enable device is present, the starting module closes the contacts of a starter solenoid relay which initiates operation of the internal combustion engine. Once the internal combustion engine has started, the starting module can detect subsequent depression of the start button. When the start button is depressed while the engine is running, an ignition shorting circuit is actuated to interrupt operation of the internal combustion engine. In one embodiment of the disclosure, the ignition shorting circuit could be a relay having contacts that are either opened or closed to interrupt operation of the internal combustion engine.

In the push button starting system of the present disclosure, the electric load and starter solenoid are operated only when the enable device is present. If the enable device is removed, the starting module prevents activation of the internal combustion engine. In this manner, the push button starting module of the present disclosure requires the enable device to be present and depression of the start button before the operation of the internal combustion engine is initiated.

The starting module can include at least three different types of control circuit in accordance with the present disclosure. In the first embodiment, the control circuit includes a microprocessor. In the second embodiment, the control circuit includes analog circuits. In a third embodiment, the control circuit includes a discrete digital logic circuit. In each case, the control circuit is self-contained in a housing of the starting module such that the starting module can simply replace a key-switch module of the lawn tractor.

Various other features, objects and advantages of the invention will be made apparent from the following description taken together with the drawings.

BRIEF DESCRIPTION OF THE DRAWINGS

The drawings illustrate the best mode presently contemplated of carrying out the invention. In the drawings.

DETAILED DESCRIPTION OF THE DRAWINGS

The present disclosure is directed to a starting system for an internal combustion engine of outdoor power equipment, such as but not limited to a lawn tractor, walk-behind mower, pressure washer, portable electric generator, snow blower or other similar type of equipment. The drawings figures depict the use of the starting system with one type of equipment, namely a lawn tractor. However, it should be understood that the starting system could be utilized with other types of outdoor power equipment while falling within the scope of the disclosure and the claims.

Figure 1:
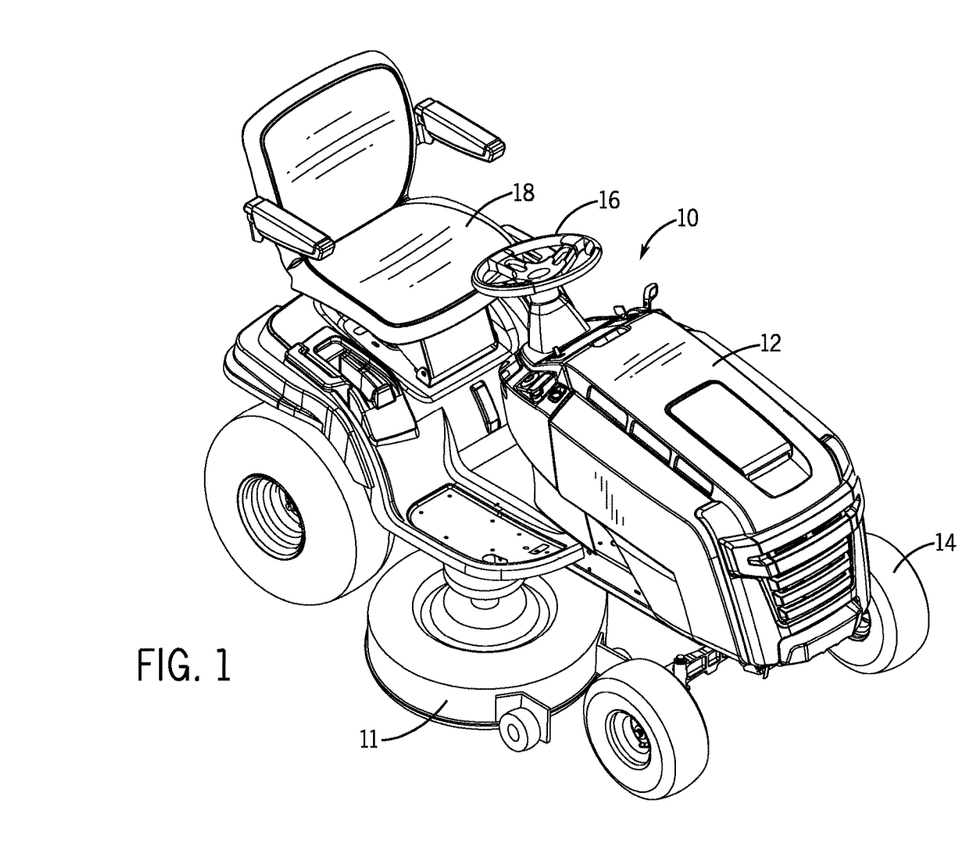
FIG. 1 is a perspective view of a lawn tractor including the push button starting system of the present disclosure.

FIG. 1 illustrates a riding lawn tractor 10 that typically includes a mowing assembly 11 mounted beneath a vehicle chassis 12 supported by four wheels 14. The lawn tractor 10 includes an internal combustion engine (not shown) that powers both the rear drive wheels and a mower blade contained within the mowing assembly 11. A steering wheel 16 allows an operator positioned in the seat 18 to control the movement of the lawn tractor 10, as is conventional. The details of the lawn tractor 10 shown in FIG. 1 are meant for illustrative purposes only since the lawn tractor 10 could have various different operator controls and physical configurations while falling within the scope of the present disclosure.

Figure 2:
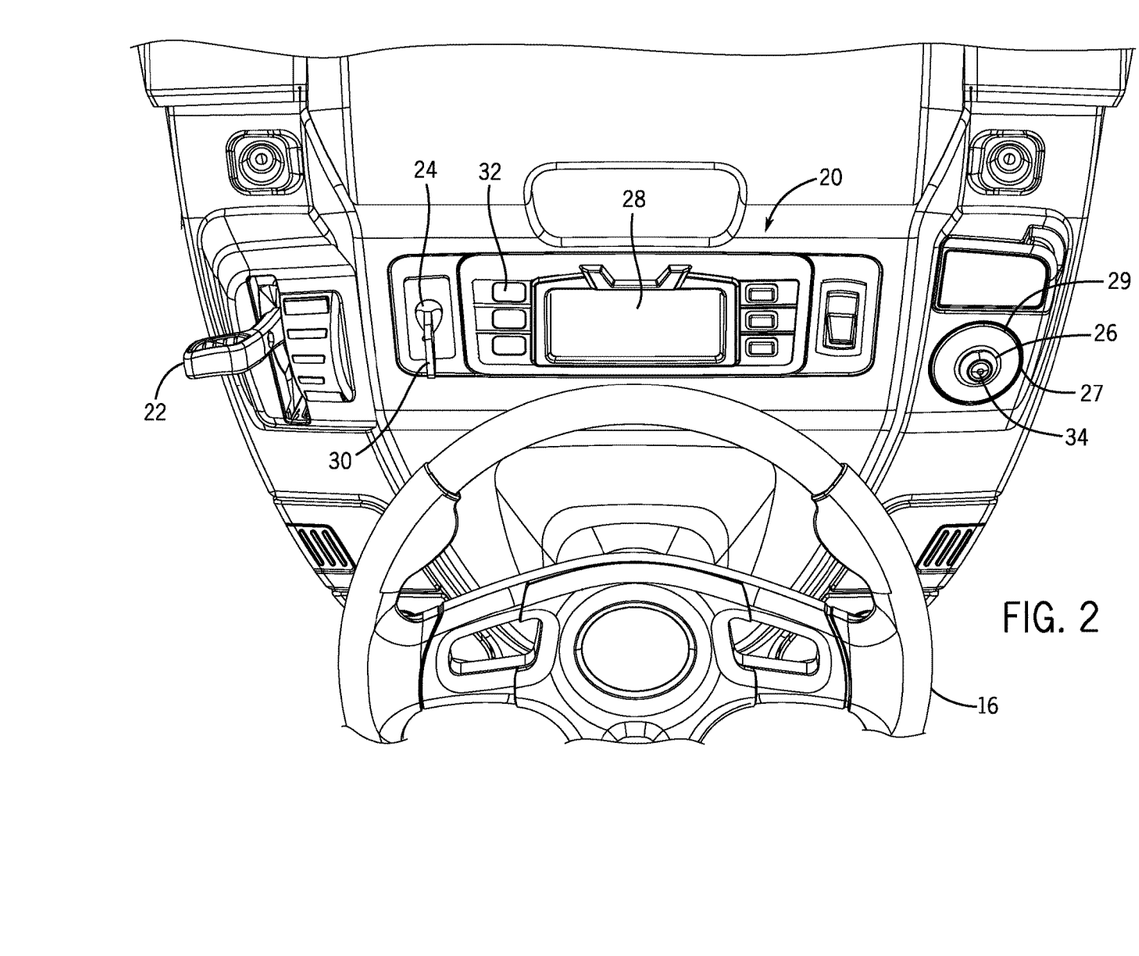
FIG. 2 is a magnified view of the dashboard of the lawn tractor including the push button starting system of the present disclosure.

FIG. 2 generally illustrates the dashboard 20 visible to the operator when the operator is in the seated position. The dashboard 20 includes the steering wheel 16, a speed selection handle 22, an enable device receptacle 24, a start button 26 and a display panel 28. Although these operating components are shown included on the dashboard 20, it should be understood that various other components could be utilized while operating within the scope of the present disclosure.

As illustrated in FIG. 2, the enable device receptacle 24 receives an enable device 30. The enable device 30 can be removed from the enable device receptacle 24 and carried with the operator when the lawn tractor is not in use. Removal of the enable device 30 from the enable device receptacle 24 will render the tractor inoperative, as will be described below. In contemplated embodiments of the disclosure, the enable device 30 could be any component that is received and detected by the enable device receptacle 24, such as a key fob received in a key fob receptacle. Likewise, the enable device receptacle 24 could be any type of receptacle that is capable of detecting the presence of the enable device 30. As an example, the enable device receptacle 24 could be a simple switch that moves from one position to another upon receipt of the enable device 30. Alternatively, the enable device 30 could include a magnetic section and the enable device receptacle 24 would detect the presence of the magnetic section. Various other alternate embodiments are contemplated as being within the scope of the present disclosure, one of which is described below.

The display panel 28 is surrounded by six individual data entry buttons 32 that can be selectively depressed by the operator to provide input to the controller (not shown) used to operate the lawn tractor. As an example, information can be presented on the display panel 28 and the operator can depress one or more of the entry buttons 32 to provide inputs to the tractor controller.

In the embodiment shown in FIG. 2, the start button 26 is part of a starting module 27 that is received in a receptacle 29 formed in the dashboard 20. The starting module 27 is designed to replace a standard key-switch typically included in the dashboard 20.

The start button 26 is a push button having a visual indicator 34. The visual indicator 34 can be one of several different components, but in the illustrated embodiment the visual indicator 34 is an LED activated by a controller in the starting module 27 to indicate depression of the start button 26, as will be described in greater detail below. In the embodiment illustrated, the start button 26 is a push button that can be depressed and held in an activated position by the operator. The start button 26 is designed to allow the operator to initiate operation of the internal combustion engine of the lawn tractor upon depressing and holding the start button 26.

Figure 3:
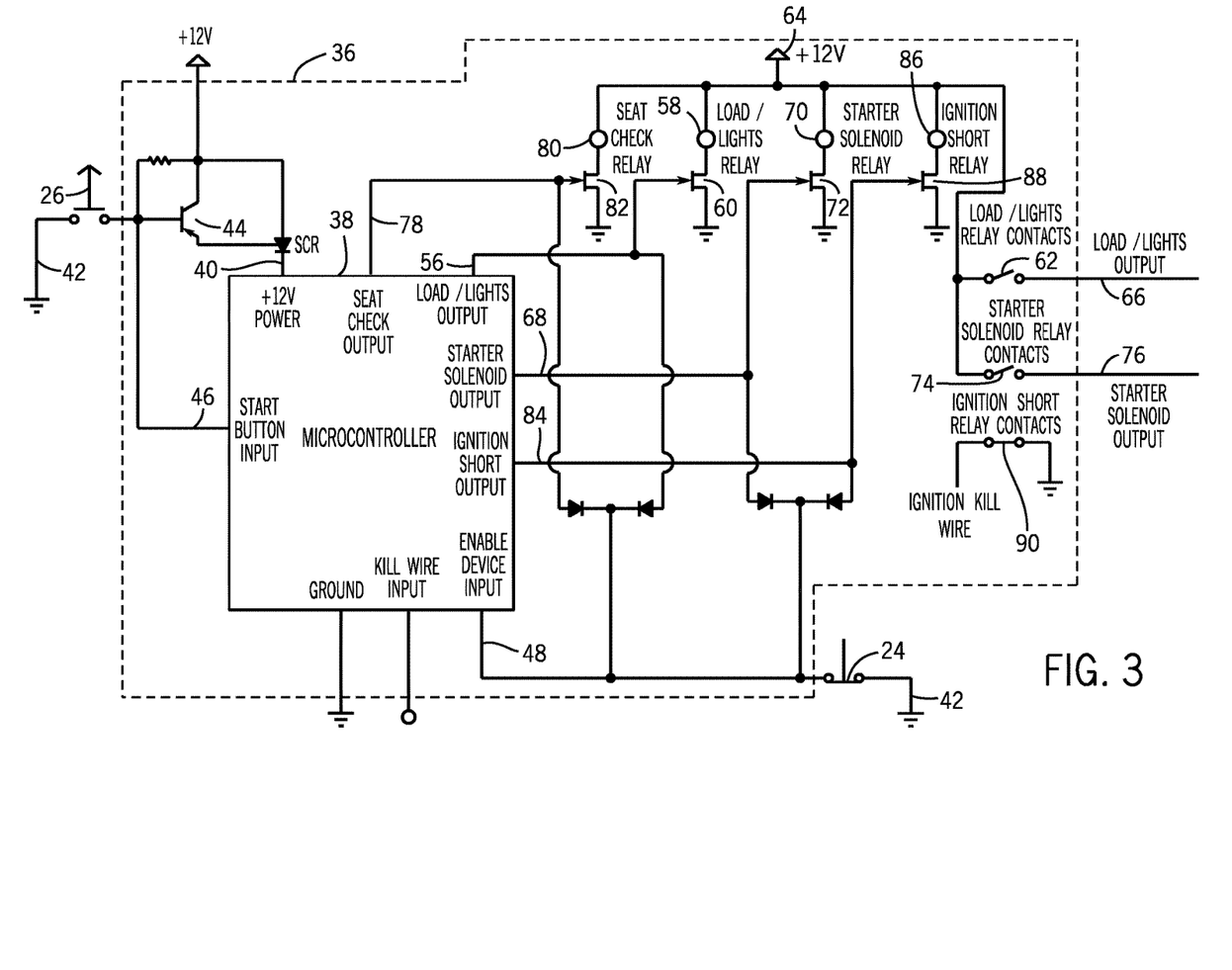
FIG. 3 is an electronic schematic illustration of the push button starting system of the present disclosure.

FIG. 3 illustrates the electronic components and the configuration for the starting system 36 of the present disclosure. As indicated previously, the starting system 36 is included in the starting module and includes a controller 38. In the embodiment shown in FIG. 3, the controller 38 is a microcontroller, such as and 8-bit 89LPC936, available from NXP Semiconductors. However, it is contemplated that other types of controllers could be utilized while operating within the scope of the present disclosure.

The controller 38 includes a power input pin 40 that is connected to the start button 26. The start button 26 is a normally open switch that is connected between ground 42 and a transistor 44. When the normally open start button 26 is activated, the start button 26 provides a path from the base of transistor 44 to ground. The ground connection provides a start signal to the controller 38 at the start button input pin 46. The start signal is provided at start button input pin 46 as long as the normally open start button 26 remains in its closed, depressed condition. The controller 38 monitors the duration of time the start signal is provided on the start button input pin 46, as will be described in greater detail below.

The controller 38 is further connected to the enable device circuit 24. As indicated above, the enable device circuit 24 could be a normally closed switch. During the normally closed condition, the enable device circuit 24 provides a connection from the enable device input pin 48 to ground 42. When the enable device for the lawn tractor is present, the normally closed enable device circuit 24 opens, which is sensed by the controller 38 through the enable device input pin 48.

The controller 38 includes a load output pin 56 that is coupled to a load relay 58 through a transistor 60. The load relay 58 includes normally open load relay contacts 62 connected between the 12-volt power supply 64 and the electrical load for the tractor present along output line 66. When the controller 38 desires to energize the electrical load for the lawn tractor, the controller 38 generates a signal along the load output pin 56. If the enable device is in the enable device receptacle 24, the signal present at the load output pin 56 activates the transistor 60, which in turn closes the normally open load relay contacts 62. However, if the enable device is not present, the enable device circuit 24 provides a path to ground 42 from the base of transistor 60. Thus, the controller 38 can only close the load relay contacts 62 when the enable device is detected by the circuit 24.

The controller further includes a starter solenoid output pin 68 that is connected to a starter solenoid relay 70 through a transistor 72. Once again, if the enable device is not present, the base of the transistor 72 is connected to ground and the controller 38 cannot close the normally open starter solenoid relay contacts 74. However, if the enable device is present, the controller 38 can close the normally open starter solenoid relay contacts 74 to provide power to the starter solenoid along output line 76.

The controller 38 includes an ignition short output pin 84 that is connected to an ignition shorting circuit, which is shown by relay 86 through a transistor 88. Although the ignition shorting circuit is shown in the drawing Figures as a relay 86, other types of circuits could be utilized while operating within the scope of the present disclosure. Once again, when the enable device is not present, the base of transistor 88 is grounded through the enable device circuit 24. However, when the enable device is present, an output signal at the ignition short output 84 activates the ignition shorting circuit, which causes the normally closed ignition short relay contacts 90 to move to an open position. When the ignition short relay contacts are in an open position, operation of the internal combustion engine is allowed, and when closed, engine operation is terminated.

Figure 4:
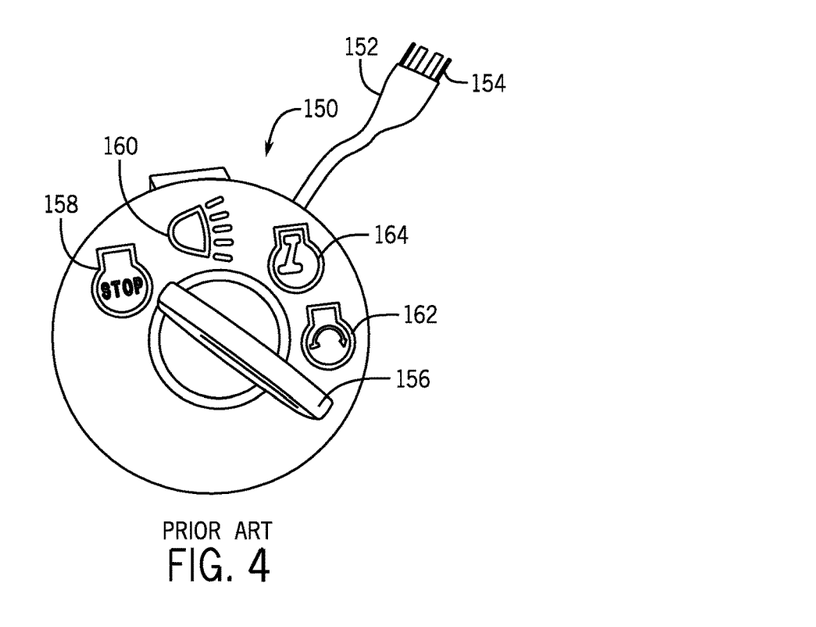
FIG. 4 is a front perspective view of a prior art key-switch module.

FIG. 4 illustrates a conventional key-switch module 150 that is used with lawn tractors. The key-switch module 150 includes a conventional plug 152 having a series of pre-designated connectors 154. The plug 152 and connectors 154 allow the key-switch module 150 to be inserted into the lawn tractor during assembly. As illustrated in FIG. 4, the key-switch module 150 includes a key-switch 156 that can be positioned between multiple positions each illustrated by a graphic symbol. In the embodiment shown in FIG. 4, the key-switch 156 can be positioned between a stop position 158, an auxiliary lighting position 160, an engine cranking position 162 and an operating position 164. The key-switch module 150 is a conventional component that is included in many riding lawn mowers which are prewired to accept the plug 152 and connector 154.

During normal use of the key-switch module 150, an operator twists the key-switch 156 to the cranking position 162 to crank the engine until the engine starts. Once the engine starts, the key-switch 156 is released and springs back to a running position. If the operator wishes to stop the engine, the key-switch 156 must be twisted to the stop position 158. In an embodiment that includes a light switch built into the key-switch module 150, the operator can move the key-switch 156 to the light position to activate the lights of the tractor.

In addition to the key-switch module 150 shown in FIG. 4, the lawn mower can also a key-switch module 150 that includes a reverse mow (RMO) disabler that allows the user to operate the lawn tractor or other device in reverse when the mower blades or other implements are turned on. When the engine is running, the operator can move the key-switch to the RMO position, which overrides the system. Although this type of RMO switch is not shown on the key-switch module 150 in FIG. 4, the starting system of the present disclosure has been designed to accommodate both key-switch modules that include a lighting position 160 or an RMO switch.

Figure 5:
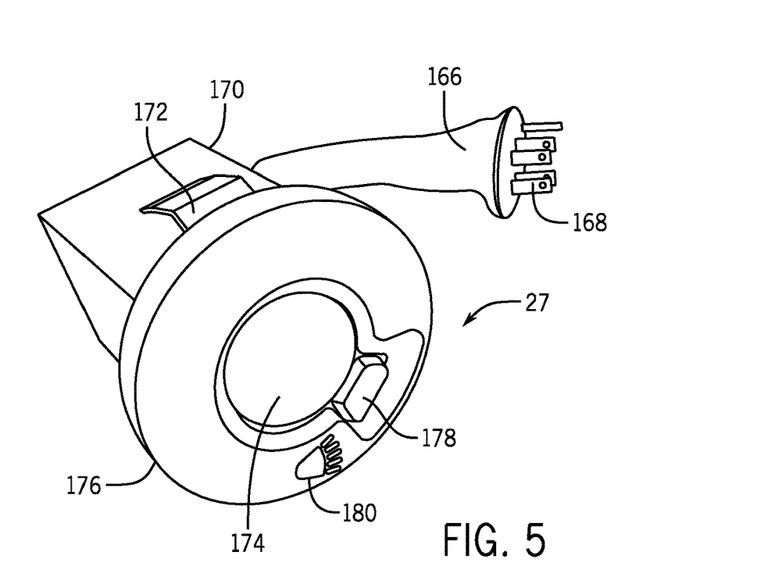
FIG. 5 is a front perspective view of a first embodiment of a starting module in accordance with the present disclosure.

FIG. 5 illustrates a first embodiment of a starting module 27 constructed in accordance with the present disclosure. The starting module 27 is designed to replace the key-switch module 150 shown in FIG. 4. The starting module 27 includes a plug 166 and a series of connectors 168. The plug 166 and connectors 168 are configured to match those included on the key-switch module 150 shown in FIG. 4 such that the starting module 27 can simply replace the key-switch module 150 in the dashboard of the lawn tractor.

The starting module 27 includes an outer housing 170 that encloses the internal operating components of the starting module. A locking tab 172 is included on the outer housing 170 to lock the starting module in position on the dashboard. The starting module 27 includes a push button 174 that can be depressed by a user as described previously with respect to the first embodiment of the starting system. In the embodiment illustrated in FIG. 5, the push button 174 is surrounded by a removable enable device 176, the details of which will be discussed in greater detail below. The starting module 27 shown in FIG. 5 includes an additional auxiliary button 178 that is accessible to the user through the enable device 176. In the embodiment shown in FIG. 5, the auxiliary button 178 activates the lights of the lawn tractor when depressed. Indicator 180 provides a visual indication to the user as to the function of the auxiliary button 178.

Figure 6:
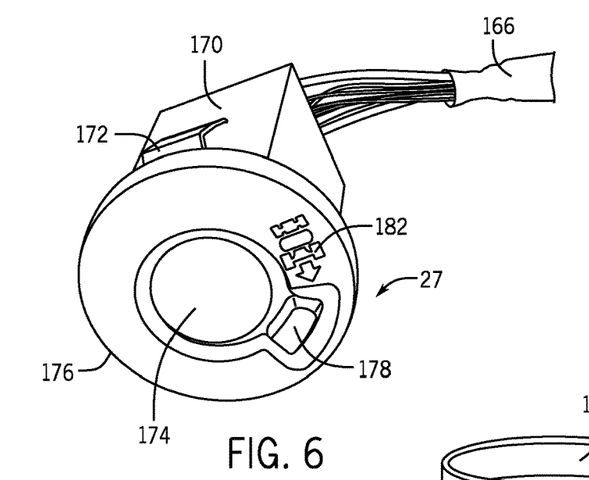
FIG. 6 is a front perspective view of a second embodiment of a starting module in accordance with the present disclosure.

FIG. 6 illustrates a second embodiment of the starting module 27. The starting module 27 shown in FIG. 6 includes many of the same components as shown in the embodiment of FIG. 5 and such components are labeled with corresponding reference numerals. In the embodiment shown in FIG. 6, the auxiliary button 178 is designed to function as an RMO override switch, which is indicated by the indicator 182. The starting module 27 shown in FIG. 6 includes a similar plug 166 and connectors 168 that allow the entire module 27 to fit into the existing key-switch slot on the dashboard of a lawn tractor or similar device (e.g., Delta System Key-switch Slot 6900-47P). In each embodiment, the starting module includes the push button 174 that, when the starting module is inserted into the slot in the dashboard, is visible and accessible to a user. The starting module includes the plug 166 and connectors 168 for connection to a standard wire hardness connector (e.g., Delta System Key-switch Connector 972311) which connects to the conventional key-switch wire harness on the lawn tractor or other device. In this way, the starting module shown in FIGS. 5 and 6 can easily replace the existing key-switch module 150 shown in FIG. 4. It is contemplated that the connector contained on either of the starting modules could be configured to be compatible with various different types of proprietary connectors contained within a lawn tractor and that the shape of the housing and the entire module could be changed depending upon the dash mount receptacle.

Figure 7:
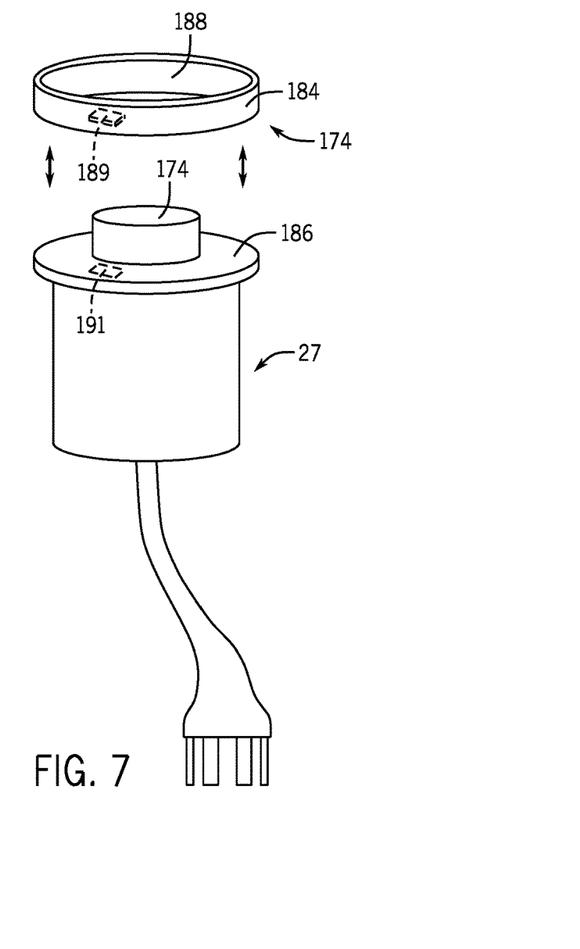
FIG. 7 is a view showing the removal of an enable device from the starting module.
Figure 8A:
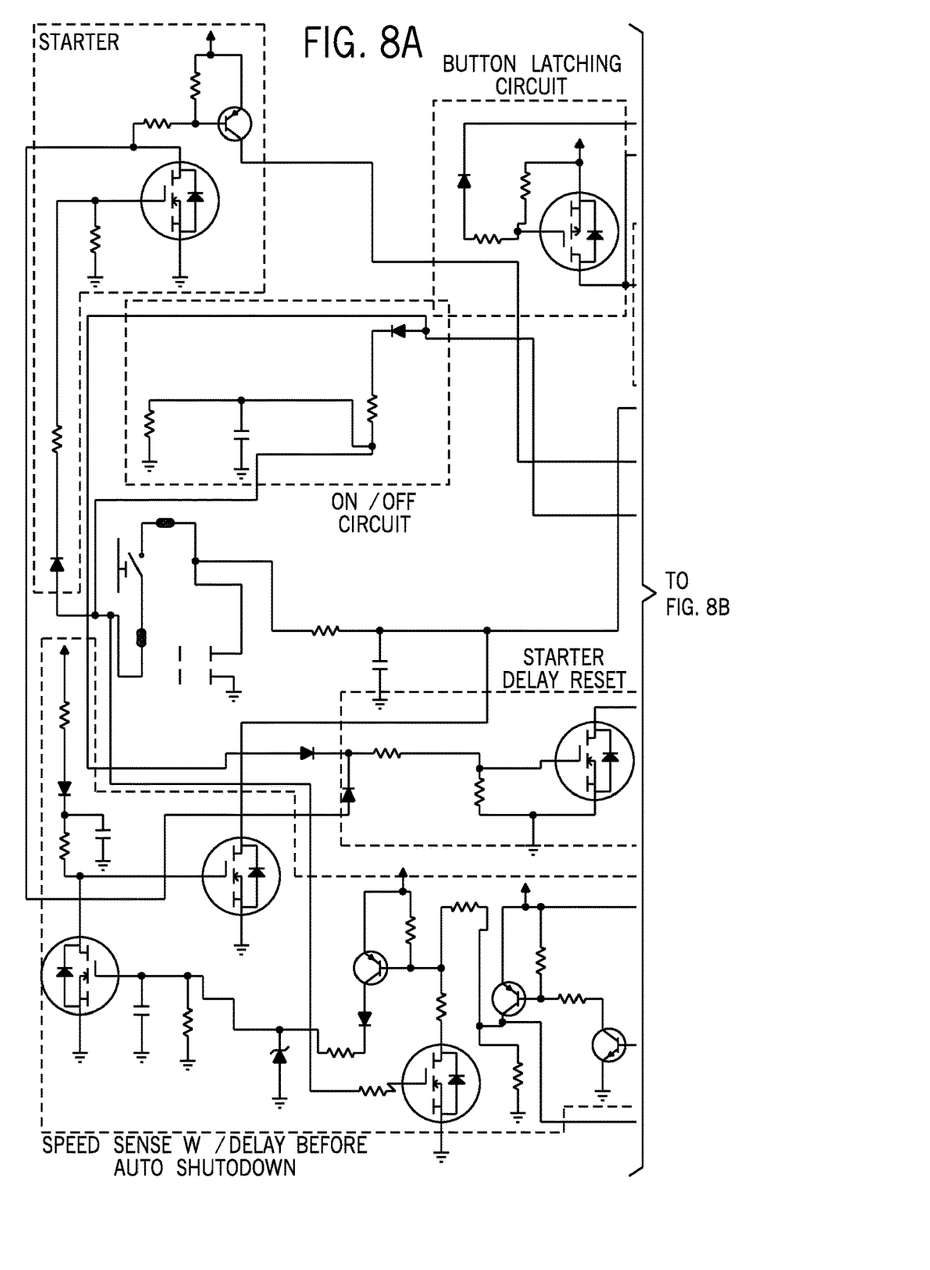
FIGS. 8A-8C are views, when taken together showing a circuit diagram of the analog control circuit included in the starting module.
Figure 8B:
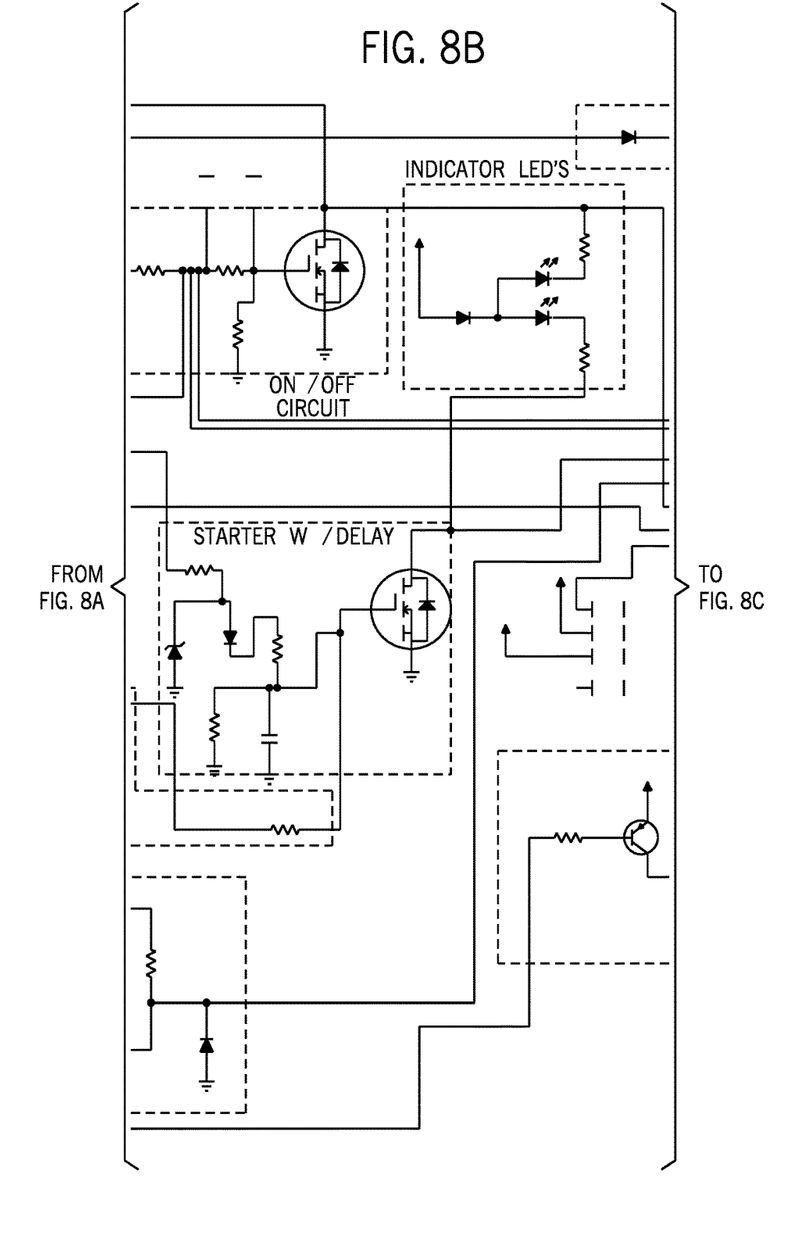
Figure 8C:
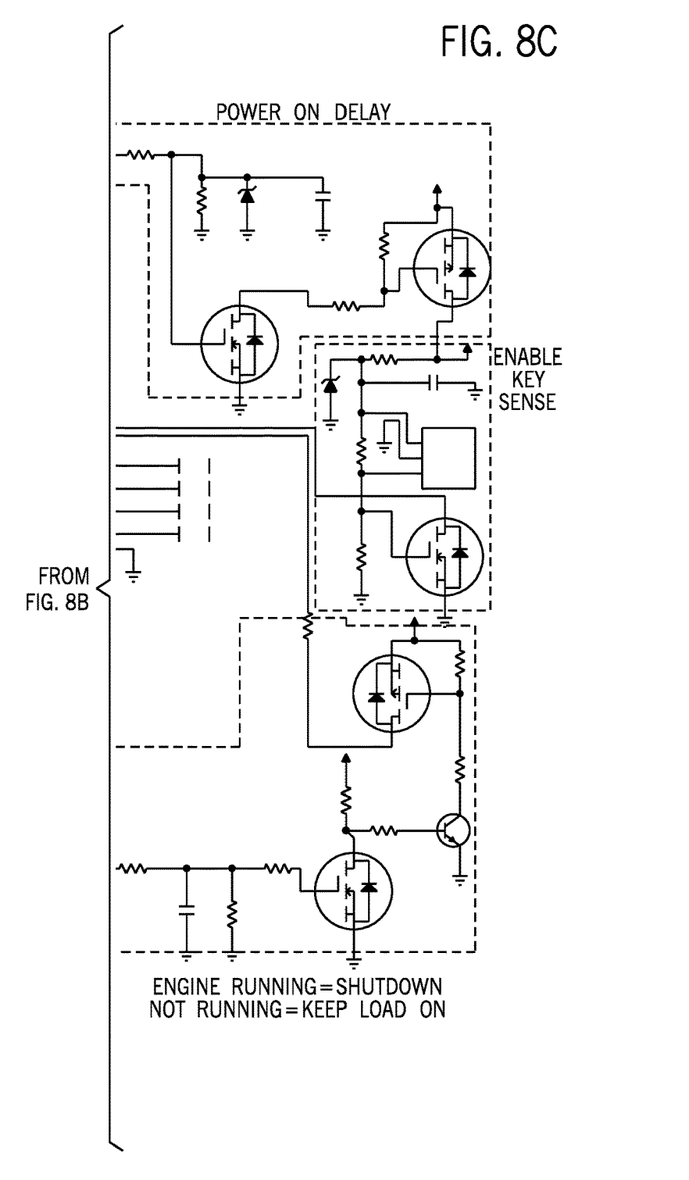

FIG. 7 illustrates one embodiment of the enable device 176 that is incorporated into the starting module 27 in accordance with the present disclosure. It is contemplated that the embodiment shown in FIG. 7 is one type of an enable device that could be utilized within the scope of the present disclosure. Other types of enable devices 176 that are located separate from the starting module 27 are contemplated as being within the scope of the present disclosure. As an example, the enable device could be an RF module that would be sensed by a sensor on the lawn tractor. The RF module could be in the operator's pocket or carried with the operator and the presence sensed by the tractor. Alternatively, the enable device could be another type of sensor on the lawn tractor that would detect the physical presence of the operator. In yet another contemplated embodiment, the enable device could be an operator input, such as a password, PIN code or some other element that would be unique to the operator.

The removal of the enable device 176 from the starting module 27 in the embodiment shown, or removal of the enable device from a detection area in the other contemplated embodiments, automatically shuts down the system when the engine is running and prohibits the starting system from working when the enable device is not present. In the embodiment shown in FIG. 7, the enable device 176 is integrated into the starting module 27. The enable device 176 includes a ring-like body 184 that is received upon a top surface 186 of the starting module 27. The center opening 188 surrounds the push button 174 such that the push button 174 is accessible when the enable device 176 is received on the starting module 27. In the embodiment illustrated, the enable device 176 includes one or more magnets 189 that interact with corresponding magnets 191 formed within the housing of the starting module 27. When the enable device 176 is received on the housing, as is shown in FIGS. 5 and 6, the magnets 189 in the enable device body 184 hold the enable device on the housing and close a set of contacts within the housing. The closed set of contacts provides an indication that the enable device 176 is in place.

When the enable device 176 is removed, the magnetically held contacts open and the system can determine that the enable device is no longer present, which prevents the initial operation of the internal combustion engine or shuts down the internal combustion engine if the engine is running. Although various different types of enable devices could be utilized, it is contemplated that utilizing an enable device 176 including internal magnets allows the system to be substantially waterproof, which is desirable for electronic-components that may be exposed to elements such a rain and snow. It is contemplated that although the magnetic enable device 176 is shown as part of the starting module one embodiment, the magnetic enable device 176 is not necessary for the integrated starting module of the present disclosure. Further, it is contemplated that other types of enable devices or some other type of mechanical system may also be utilized as an enable device. However, the embodiment shown in FIG. 7 allows the enable device to be integrated into the starting module such that the entire starting module can be used in place of the key-switch module 150 shown in FIG. 4.

It is contemplated that the starting module 27 constructed in accordance with the present disclosure could include three different types of internal circuitry to control the activation of the internal combustion engine upon depression of the push button switch. In one embodiment, the control circuit contained within the housing could include the microprocessor based controller 38 shown in FIG. 3. Such a system could include the control and operating circuitry on a first control board while the power components could be included on a second board. Alternatively, both the control components and power components could be mounted to a single board contained within the housing of the start module.

In a second, alternate embodiment, the starting module 27 could be configured to utilize an analog circuit as the control circuit, which would also be housed within the outer housing 170 of the start module. Analog circuitry will reduce the cost of the starting module yet provide the same general functionality as a microprocessor-based starting system. FIGS. 8A-8C and 9 illustrate one embodiment of the analog circuit that could be utilized in accordance with the present disclosure. FIGS. 8A-8C and 9 show the analog circuit split between two circuit boards, namely a start signal board (FIGS. 8A-8C) that includes the components required for signal processing and a power board shown in FIG. 9. The analog control circuit shown in FIGS. 8A-8C and 9 is meant for illustrative purposes only and is not meant to illustrate one of the various different types of configurations that could be utilized while operating within the scope of the present disclosure.

Figure 9:
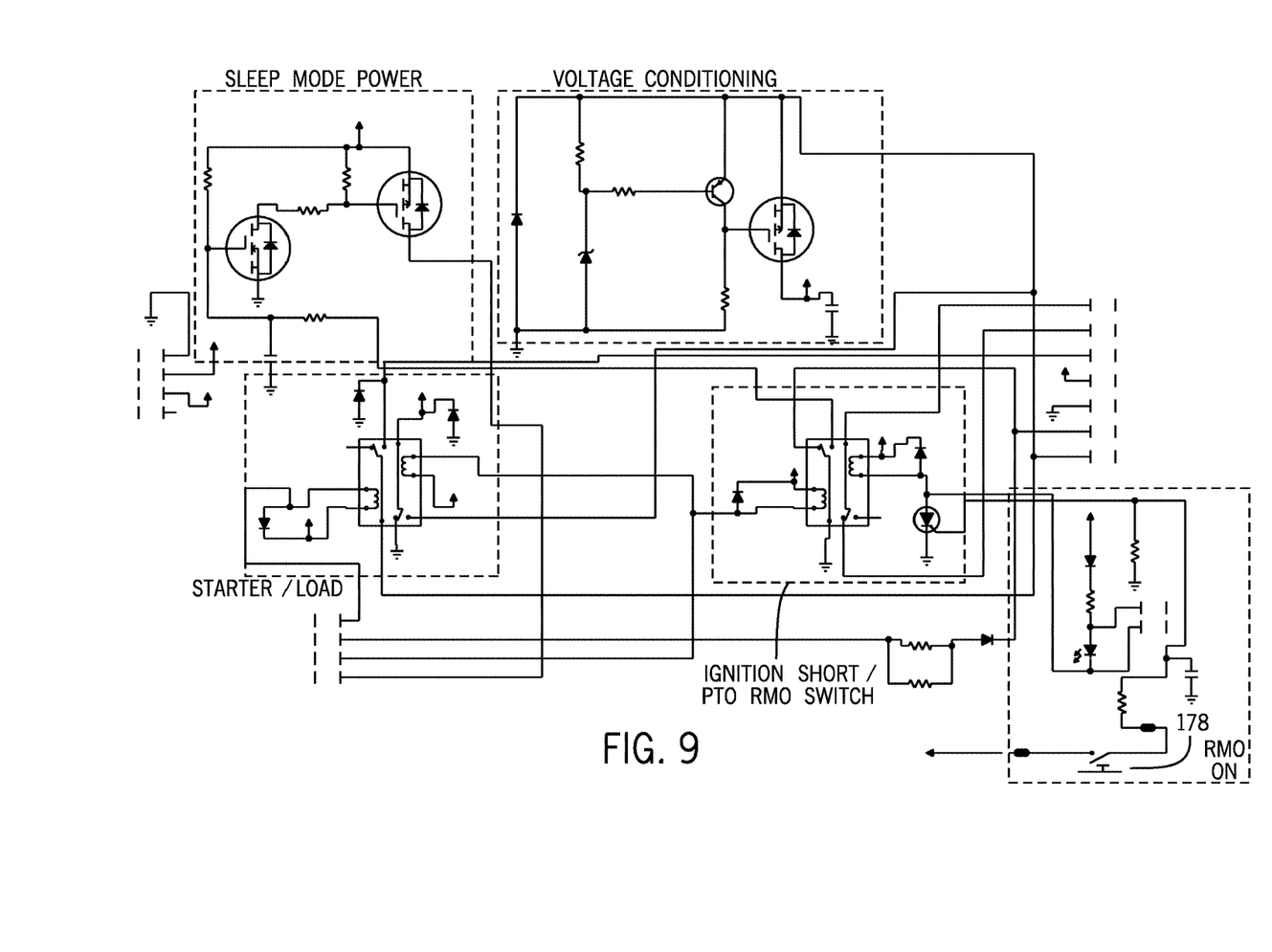
FIG. 9 is a circuit diagram of the analog power circuit included in the starting module.

In the embodiment shown in FIG. 9, the RMO push button switch 178 is illustrated. However, it is contemplated that this switch could be eliminated from the components shown.

While FIGS. 8A-8C and 9 show the analog control circuit split between two circuit boards, it is possible for the circuit to be present on a single circuit board. Additionally, the high current components shown in FIG. 9 could be placed on a hard (e.g., FR 4) circuit board, while the low current components could be placed on a separate, flexible circuit board (e.g., flex circuit) to better utilize space within the starting module. In accordance with the embodiment shown in FIGS. 8A-8C and 9, no specialized controller is required to be included within the starting module for the push button starting system to function.

In a third, alternate embodiment not shown, the control circuit contained within the starting module could be configured to include discrete digital logic circuits that are designed to carry out the same functions as the microprocessor based control circuit and the analog control circuit. In such an embodiment, the discrete digital logic circuit would be comprised of discrete digital logic components such as AND gates, OR gates, transistors, resistors and similar components that allow the discrete digital logic circuits to carry out similar functions to those described above.

The microprocessor based control circuit schematic of FIG. 3 is one embodiment of the present disclosure. However, it is contemplated that other microprocessor based embodiments could be utilized while operating within the scope of the present disclosure. The actual operation of the controller shown in FIG. 3 will now be described with reference to FIG. 10.

Since the controller 38 shown in FIG. 3 is operated from the 12-volt power supply 64, it is desirable that the controller 38 remains in a "sleeping" mode during periods of non-use. It is particularly desirable that the controller 38 remain in a sleeping mode even when the enable device is present, since it is contemplated that many operators of the lawn tractor will allow the enable device to remain on or near the lawn tractor at all times.

Figure 10:
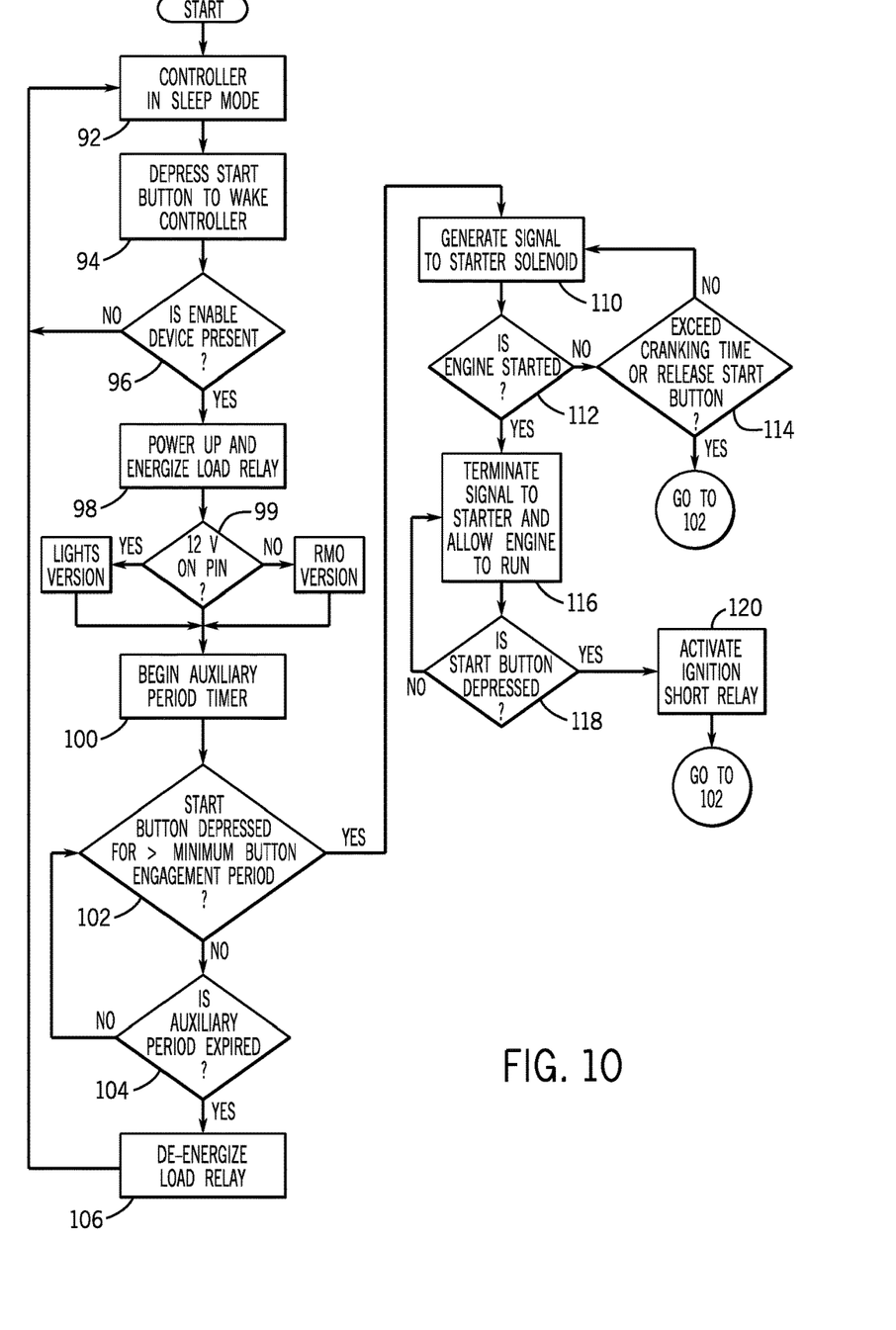
FIG. 10 is a flowchart illustrating one possible sequence of operation of the push-button starting system of the present disclosure.

As indicated in step 92, the controller 38 remains in the sleep mode until the controller 38 senses the depression of the start button 26, as indicated in step 94. When the controller 38 receives the start signal at the start button input pin 46, the controller 38 awakens and initially determines whether the enable device is present or within sensing range, as illustrated in step 96. If the controller determines in step 96 that the enable device is not present, the controller returns to the sleep mode without ever activating the electric load for the lawn tractor. In this manner, activation of the electric load requires both the depression of the start button 26 and the presence of the enable device.

If the controller determines in step 96 that the enable device is present, the controller energizes the load relay 58 in step 98. To do so, the controller generates a high signal on the load output pin 56, which in turn activates the transistor 60 and moves the normally open load relay contacts 62 to the closed condition. Activation of the electric load allows the operator to use the tractor headlights, view the display and operate any other electric components of the tractor.

After the load relay has been powered in step 98, the system moves to step 99 to determine whether a 12-volt signal is present at an input pin. If the 12-volt signal is present, the presence of the 12-volt signal indicates that the starting module is the "lights" version shown in FIG. 5. If the 12-volt signal is not present, the system determines that the starting module is the "RMO" version. In this manner, the internal circuitry can determine the type of the module, which allows one push button module to cover both the RMO and lights version of the starting module.

After the electric load for the tractor has been energized, the controller starts the auxiliary period timer in step 100. After the auxiliary period timer is started, the controller determines in step 102 whether the start button 26 has been depressed for longer than a minimum engagement period. In one embodiment of the present disclosure, the controller 38 will not start the internal combustion engine unless the start button is depressed for longer than the minimum engagement period. As an example, the minimum engagement period could be 0.5 seconds, although other time periods are contemplated. The use of a minimum engagement period prevents inadvertent depression of the start button from beginning operation of the internal combustion engine. However, it is contemplated that the minimum engagement period should have a duration sufficiently small to prevent the operator from having to hold the start button in the depressed condition for an undesirably long period of time.

If the controller determines in step 102 that the start button was depressed for less than the minimum engagement period, the controller continues to count down the auxiliary period timer. The auxiliary period timer allows the controller to set an auxiliary period during which the electric load is supplied with electric power from the lawn tractor battery. In this manner, if the operator depresses the start button for a very brief period of time when the enable device is present, the controller 38 provides electric power to the electric load of the tractor for the auxiliary period. In the currently preferred embodiment, the auxiliary period is approximately two minutes, although other periods of time are contemplated as being within the scope of the present disclosure.

In step 104, the controller 38 determines whether the two minute auxiliary period has expired. If the auxiliary period has not expired, the timer continues to count until the auxiliary period has expired. Once the auxiliary period has expired, the controller de-energizes the load relay contacts 62, as illustrated in step 106. When the load relay contacts are de-energized and opened, electric power is interrupted to the electric load. After the electric power to the load is interrupted, the controller returns to the sleep mode, as illustrated in step 92. In this manner, the controller 38 provides electric power to the electric load, including the light for the lawn tractor, for the auxiliary period after the start button has been activated for less than the minimum engagement period. Thus, if the operator desires to operate the electric load of the tractor without actually initiating the engine operation, the operator can depress the start button 26 for less than the 0.5 second minimum engagement period.

If the controller determines in step 102 that the start button was depressed for longer than the minimum engagement period, the controller then generates a signal to the starter solenoid relay 70, as illustrated in step 110. The signal to the starter solenoid relay 70 causes the normally open starter solenoid relay contacts 74 to close, thus providing electrical power to the starter solenoid along output line 76. The output signal is supplied to the starter solenoid until the engine begins operation. In step 112, the controller determines whether the engine has started. If the engine has not started, the controller determines in step 114 whether the cranking period has been exceeded or whether the start button has been released. As an example, the controller 38 will provide an output signal to the starter solenoid only for a maximum cranking period, such as 20 seconds, or until the user releases the start button. If the engine does not begin operation during this cranking period, the system returns to monitoring the start button and the auxiliary period timer in step 102.

If the controller determines in step 112 that the engine has started, the controller 38 terminates the signal to the starter solenoid relay contacts, which opens the contacts and allows the internal combustion engine to run in a normal manner, as illustrated in step 116. During operation of the internal combustion engine, the controller 38 continues to monitor for whether the start button has been depressed, as indicated in step 118. During normal operation of the internal combustion engine, if the start button 26 is depressed, this indicates that the operator wishes to stop operation of the internal combustion engine. When the start button is depressed in step 118, the controller 38 activates the ignition shorting circuit, which in the embodiment shown includes relay contacts 90, as illustrated in step 120. When the ignition short relay contacts 90 are closed, operation of the internal combustion engine is interrupted.

As can be understood by the above description, the presence of the enable device opens a connection to ground. If the enable device is removed, the removal of the enable device overrides the controller 38 and prevents the controller 38 from changing the condition of the load relay contacts 62, the starter solenoid relay contacts 74 and the ignition short relay contacts 90. In this manner, the enable device is an override for the controller 38. Thus, the enable device must be present for the controller to initiate activation of the internal combustion engine.

Figure 11:
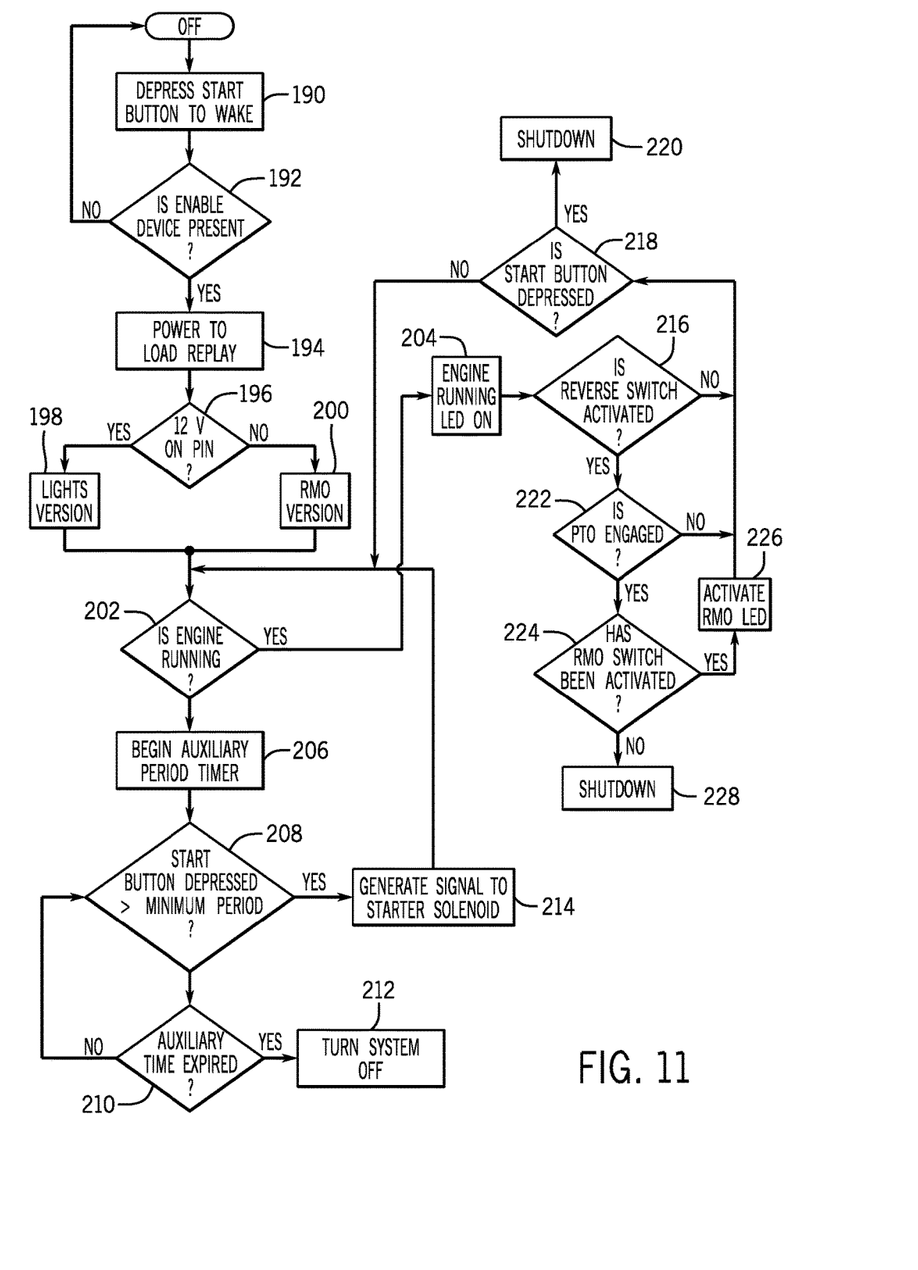
FIG. 11 is a flowchart illustrating another possible sequence of operation of the analog push-button starting system of the present disclosure.

FIG. 11 illustrates the operating steps performed by the analog control circuit that is shown in FIGS. 8A-8C and 9. The method steps for the analog circuit shown in FIG. 11 are similar to the method steps for the microprocessor based circuit shown in FIG. 10. Initially, the system detects an initial brief depression of the start button, which will "wake" the electrical components of the lawn tractor which will power up the system and energize a load relay. The system will initially determine in step 192 whether the enable device is present. If the enable device is not present, the system will return to the "sleep" mode.

However, if the enable device is sensed in step 192, the system will move to step 194 and provide power to a load relay. Activation of the electric load relay allows the operator to use the tractor headlights, view the display, and operate any other electrical components of the tractor.

After the load relay has been powered in step 194, the system moves to step 196 to determine whether a 12-volt signal is present at an input pin. If the 12-volt signal is present, the presence of the 12-volt signal indicates that the starting module is the "lights" version shown in FIG. 5. If the 12-volt signal is not present, the system determines in step 200 that the starting module is the "RMO" version. In this manner, the internal circuitry can determine the type of the module, which allows one push button module to cover both the RMO and lights version of the starting module.

After making this determination, the system determines in step 202 whether the engine is currently running. If the engine is running, the system activates an LED in step 204 to provide such an indication. However, if the engine is not running, the system moves to step 206 and starts an auxiliary period timer.

After the auxiliary period timer is started in step 206, the system determines in step 208 whether the start button has been depressed for longer than a minimum engagement period. In one embodiment, the circuit will not start the internal combustion engine unless the start button is depressed for longer than the minimum engagement period. As an example, the minimum engagement period could be 0.5 seconds, although other time periods are contemplated. The use of a minimum engagement period prevents inadvertent depression of the start button from beginning operation of the internal combustion engine. However, it is contemplated that the minimum engagement period should have a duration sufficiently small to prevent the operator from having to hold the start button in the depressed condition for an undesirably long period of time.

If the control circuit determines in step 208 that the start button was depressed for less than the minimum engagement period, the system continues to count down the auxiliary period timer. During the auxiliary period, the control circuit continues to monitor for depression of the start button. If the start button is depressed again for less than the minimum engagement period, the control circuit could either keep the auxiliary timer running or could reset the auxiliary period time after the start button is released to extend the time the electric load is activated. The auxiliary period timer allows the control system to set an auxiliary period during which the electric load is supplied with electric power from the lawn tractor battery. In this manner, if the operator depresses the start button for a very brief period of time when the enable device is present, the system provides electric power to the electric load of the tractor for the auxiliary period. In the currently preferred embodiment, the auxiliary period is approximately two minutes, although other periods of time are contemplated as being within the scope of the present disclosure. In step 210, the system determines whether the two minute auxiliary period has expired. If the auxiliary period has not expired, the timer continues to count until the auxiliary period does expire. In an alternate embodiment, the auxiliary period timer could be reset after a short press of the start button to extend the time the electric load is active. Once the auxiliary period has expired, the controller de-energizes the load relay contacts and turns off the system, as shown in step 212.

If the system determines in step 208 that the start button was depressed for greater than the minimal period, the controller generates a signal to the starter solenoid relay as shown in step 214. The output signal is supplied to the starter solenoid until the engine begins operation. Once the engine starts, the system again determines that the engine is running in step 202 and moves to step 216. In an embodiment in which the starting module includes the auxiliary button designated for an RMO switch, the system determines whether the RMO switch is activated. If the RMO switch is not activated, the system moves to step 218 to determine whether the start button is again depressed. If the start button is depressed when the engine is running, the system moves to step 220 and shuts down the engine.

If the system determines in step 216 that the reverse switch is activated, the system determines in step 222 whether the PTO is engaged. If the PTO is not engaged, the engine continues to operate as normal.

If the PTO is engaged, as determined in step 222, the system determines in step 224 whether the RMO switch has been activated. If the RMO switch has been activated, an LED is lit in step 226 and the engine continues to operate. However, if the RMO switch has not been activated, the engine is shut down in step 228.

In an embodiment in which the starting module includes the auxiliary button designated as a lights switch, the system can determine whether the lights switch is activated in a step similar to step 216. If the lights switch if activated, the system will turn on the headlights. Subsequent depression of the lights switch will then turn off the headlights and the light switch will function as a toggle switch to turn on and off the headlights.

As described in the description above, the control circuit, whether microprocessor based or analog, is contained within the outer housing of the starting module along with the start button. The entire starting module is self-contained and can replace the key-switch module typically used with a lawn tractor. The starting module is the same general shape and connectors as a key-switch module to facilitate easy replacement. The start button can be used instead of a key switch to start the internal combustion engine. The control circuit contained in the starting module detects the presence of an enable device, which may be received on the starting module itself. The starting module of the present disclosure allows for easy installation and possible retrofitting of lawn tractors that include key-switch modules.

Although various contacts are described in the present disclosure as being in a normally open or normally closed condition, it is contemplated that various other configurations could be utilized while operating within the scope of the present disclosure.

We claim:

1. A self-contained push button starting module for use in starting an internal combustion engine of a lawn tractor, comprising:
   an outer housing;
   a plurality of connectors for receipt by the lawn tractor;
   a manually activated start button extending from the outer housing, wherein the start button generates a start signal upon activation;
   an enable device; and
   control circuit in operative communication with the start button, wherein the control circuit receives the start signal from the start button and detects the presence or absence of the enable device, wherein the control circuit activates a starter for the internal combustion engine only upon detection of the presence of the enable device and receipt of the start signal.

2. The starting module of claim 1 wherein the start signal is continuously generated during continuous activation of the start button and the control circuit activates the starter only when the control circuit receives the start signal for longer than a minimum engagement period.

3. The starting module of claim 1 further comprising an ignition shorting circuit coupled to the control circuit, wherein the controller activates the ignition shorting circuit to interrupt operation of the engine upon receipt of the start signal when the engine is running.

4. The starting module of claim 1 wherein the enable device is selectively positionable relative to the outer housing.

5. The starting module of claim 4 wherein the enable device is received and retained on the outer housing by a magnetic force.

6. The starting module of claim 5 wherein the enable device includes at least one magnet and the control circuit senses the presence of the at least one magnet to determine the presence of the enable device.

7. The starting module of claim 1 wherein the control circuit is an analog circuit.

8. The starting module of claim 1 wherein the control circuit includes a microprocessor.

9. The starting module of claim 1 wherein the control circuit includes discrete digital logic components.

10. A method of automatically starting an engine of a lawn tractor, comprising the steps of:
    providing a self-contained starting module having an outer housing, a plurality of connectors, a manually activated start button and a control circuit;
    inserting the starting module into the lawn tractor such that the plurality of connectors interface with the tractor;
    determining in the control circuit whether an enable device is present;
    upon detecting the presence of the enable device, monitoring for the activation of the start button; and
    generating a starting signal from the control circuit to start the engine when both the start button is activated and the enable device is detected.

11. The method of claim 10 further comprising the steps of:
    continuously attempting to start the engine after detection of the start button activation;
    monitoring for operation of the engine; and
    stopping the generation of the start signal upon detecting no operation of the engine.

12. The method of claim 10 further comprising the steps of:
    determining in the controller whether the self-contained starting module includes a reverse mow override (RMO) button; and
    preventing the generation of the start signal based upon the position of the RMO button and a power takeoff switch of the lawn tractor.

13. The method of claim 10 further comprising the step of interrupting the operation of the engine upon activation of the start button after the engine is started.

14. The method of claim 10 wherein power is supplied to an electric load of the lawn tractor when the start button is activated for less than a minimum engagement period.

15. The method of claim 10 wherein the control circuit is an analog circuit.

16. The method of claim 10 wherein the control circuit includes a microprocessor.

17. The method of claim 10 wherein the control circuit includes discrete digital logic components.

18. The method of claim 10 further comprising the steps of:
    determining in the controller whether the self-contained starting module includes a lights button; and
    activating the lights of the lawn tractor upon depression of the lights button.

19. The method of claim 10 further comprising the steps of:
    determining in the controller whether the self-contained starting module includes an auxiliary button;
    determining in the controller whether the auxiliary button is wired for either an RMO function or a lights function; and
    controlling operation of the lawn tractor based on the function of the auxiliary button.

* * * * *